US012696114B2

(12) United States Patent
Kim et al.

(10) Patent No.: US 12,696,114 B2
(45) Date of Patent: Jul. 28, 2026

(54) METHOD AND APPARATUS TO FEDERATED MACHINE LEARNING IN WIRELESS COMMUNICATION SYSTEM

(71) Applicant: Samsung Electronics Co., Ltd., Suwon-si (KR)

(72) Inventors: Hyesung Kim, Suwon-si (KR); Jungshin Park, Suwon-si (KR); Dongeun Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 18/163,443

(22) Filed: Feb. 2, 2023

(65) Prior Publication Data

US 2023/0254719 A1 Aug. 10, 2023

(30) Foreign Application Priority Data

Feb. 10, 2022 (KR) ........................ 10-2022-0017639

(51) Int. Cl.
*H04W 24/08* (2009.01)
*G06N 20/00* (2019.01)

(52) U.S. Cl.
CPC ............ *H04W 24/08* (2013.01); *G06N 20/00* (2019.01)

(58) Field of Classification Search
CPC ......... H04L 41/16; H04W 24/08; G06N 3/08; G06N 3/098; G06N 20/00
See application file for complete search history.

(56) References Cited

U.S. PATENT DOCUMENTS

2022/0046101 A1* 2/2022 Zhang ..................... H04L 67/51
2022/0294606 A1* 9/2022 Norrman ................ G06N 20/00
(Continued)

FOREIGN PATENT DOCUMENTS

KR 10-2021-0144535 A 11/2021
WO 2021/172810 A1 9/2021
(Continued)

OTHER PUBLICATIONS

VIVO; Trained ML Model Sharing in Federated Learning; 3GPP TSG-WG SA2 Meeting #143E e-meeting, Feb. 24-Mar. 9, 2021, Elbonia; S2-2100859 (revision of S2-210xxxx); Feb. 18, 2021.
(Continued)

*Primary Examiner* — Jeong S Park
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method of performing federated learning by a first network data analytic function (NWDAF) is provided. The method includes determining whether to perform a federated learning based on an analytics request message from a network function (NF), receiving, from a network repository function (NRF), information regarding a second NWDAF capable of participating in the federated learning, generating a federated learning group, transmitting, to the second NWDAF, a federated learning join request message based on the information regarding the second NWDAF, and receiving, from the second NWDAF, a federated learning join response message including information regarding whether to participate in the federated learning group.

16 Claims, 8 Drawing Sheets

(56)     References Cited

U.S. PATENT DOCUMENTS

| | | | |
|---|---|---|---|
| 2022/0321423 A1* | 10/2022 | Norrman | H04L 41/0853 |
| 2022/0337486 A1* | 10/2022 | Hong | H04L 41/024 |
| 2023/0090022 A1* | 3/2023 | Han | H04L 41/145 |
| | | | 370/329 |
| 2023/0146099 A1* | 5/2023 | Ouyang | H04L 41/16 |
| | | | 709/223 |
| 2023/0224226 A1* | 7/2023 | Puente Pestaña | H04L 41/042 |
| | | | 455/414.1 |
| 2023/0269141 A1 | 8/2023 | Han et al. | |
| 2024/0333603 A1* | 10/2024 | Keshavamurthy | H04L 41/16 |

FOREIGN PATENT DOCUMENTS

| | | | |
|---|---|---|---|
| WO | 2021/244763 A1 | 12/2021 | |
| WO | 2022005037 A1 | 1/2022 | |

OTHER PUBLICATIONS

CATT; Procedures for model sharing; SA WG2 Meeting #S2-143E, Feb. 24-Mar. 9, 2021, Electronic, Elbonia; S2-2100596; Feb. 18, 2021.

OPPO; KI#2, Sol#24: Update to clarify Federated Learning in 5GC; SA WG2 Meeting #140E, Aug. 19-Sep. 1, 2020, Elbonia; S2-2005554; Aug. 13, 2020.

Samsung; Solution for KI #8: Federated Learning Group creation; 3GPP TSG-WG SA2 Meeting #150E, E-meeting, Apr. 6-12, 2022; S2-2202318; Mar. 29, 2022.

International Search Report with Written Opinion dated May 11, 2023; International Appln. No. PCT/KR2023/001544.

European Search Report dated Apr. 16, 2025, issued in European Application No. 23753070.4.

* cited by examiner

METHOD AND APPARATUS TO FEDERATED MACHINE LEARNING IN WIRELESS COMMUNICATION SYSTEM

CROSS-REFERENCE TO RELATED APPLICATION(S)

This application is based on and claims priority under 35 U.S.C. § 119 (a) of a Korean patent application number 10-2022-0017639, filed on Feb. 10, 2022, in the Korean Intellectual Property Office, the disclosure of which is incorporated by reference herein in its entirety.

BACKGROUND

1. Field

The disclosure relates to a wireless communication system. More particularly, the disclosure relates to a method for supporting federated machine learning in the wireless communication system.

2. Description of Related Art

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mm Wave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively providing a service in a wireless communication system.

Additional aspects will be set forth in part in the description which follows and, in part, will be apparent from the description, or may be learned by practice of the presented embodiments.

In accordance with an aspect of the disclosure, a method of performing federated learning by a first network data analytic function (NWDAF) is provided. The method includes determining whether to perform the federated learning based on an analytics request message from a network function (NF), receiving, from a network repository function (NRF), information regarding a second NWDAF capable of participating in the federated learning, generating a federated learning group, transmitting, to the second NWDAF, a federated learning join request message based on the information regarding the second NWDAF, and receiving, from the second NWDAF, a federated learning join response message including information regarding whether to participate in the federated learning group.

The method further includes transmitting, to the NRF, a registration request message including capability information regarding a machine learning model (ML model) aggregating function, and receiving, from the NRF, a registration response message including registration result information.

The registration request message further includes at least one of an identifier of the first NWDAF, address information of the first NWDAF, role information of the first NWDAF, supported ML model information, an identifier of analytic information provided through the federated learning, associated messaging framework adaptor function (MFAF) information, associated data collection and coordination function (DCCF) information, or service area information where the first NWDAF provides the analytic information.

The determining of whether to perform the federated learning comprises in a case in which a federated learning request indicator is included in a message received from the NF, in a case in which analytic information requested from the NF is configured to require the federated learning, or in a case in which a data set for a ML model training in the first NWDAF is not sufficient, determining to perform the federated learning.

The receiving of the information regarding the second NWDAF comprises transmitting, to the NRF, a discovery request message for requesting the information regarding the second NWDAF, and receiving, from the NRF, a discovery response message including the information regarding the second NWDAF.

The discovery request message includes at least one of capability information regarding a ML model aggregating function, an indicator for requesting the information regarding the second NWDAF, an identifier of the first NWDAF, address information of the first NWDAF, information regarding an user equipment (UE) associated with analytic information requested from the NF, information regarding the ML model used for the federated learning, or information regarding data available for training of the ML model used for the federated learning, the discovery response message includes at least one of an identifier of the second NWDAF, address information of the second NWDAF, ML model information supported by the second NWDAF, or information regarding data available for training of the ML model supported by the second NWDAF.

The federated learning join request message includes at least one of an identifier of the first NWDAF, address information of the first NWDAF, ML model training transmission expiration information in the second NWDAF, or rule information of ML model training.

The method further includes receiving, from the second NWDAF, a federated learning group generate request message, and transmitting, to the second NWDAF, a federated learning group generate response message.

The method further includes confirming the federated learning group based on the federated learning join response message, transmitting, to the second NWDAF in the confirmed federated learning group, a federated learning execution start indicator.

The method further includes receiving, from the second NWDAF, a federated learning group update request message for excluding at least one NWDAF from the federated learning group.

In accordance with another aspect of the disclosure, a first NWDAF performing a federated learning is provided. The first NWDAF includes at least one transceiver, and at least one processor operatively coupled with the at least one transceiver, wherein the at least one processor is configured to determine whether to perform a federated learning based on an analytics request message from a NF, receive, from a NRF, information regarding a second NWDAF capable of participating in the federated learning, generate a federated learning group, transmit, to the second NWDAF, a federated learning join request message based on the information regarding the second NWDAF, and receive, from the second NWDAF, a federated learning join response message including information regarding whether to participate in the federated learning group.

The at least one processor is further configured to transmit, to the NRF, a registration request message including capability information regarding a ML model aggregating function, and receive, from the NRF, a registration response message including registration result information.

The registration request message further includes at least one of an identifier of the first NWDAF, address information of the first NWDAF, role information of the first NWDAF, supported ML model information, an identifier of analytic information provided through the federated learning, associated MFAF information, associated DCCF information, or service area information where the first NWDAF provides the analytic information.

The at least one processor is further configured to in a case in which a federated learning request indicator is included in a message received from the NF, in a case in which analytic information requested from the NF is configured to require the federated learning, or in a case in which a data set for a ML model training in the first NWDAF is not sufficient, determine to perform the federated learning.

The at least one processor is further configured to transmit, to the NRF, a discovery request message for requesting the information regarding the second NWDAF, and receive, from the NRF, a discovery response message including the information regarding the second NWDAF.

The discovery request message includes at least one of capability information regarding a ML model aggregating function, an indicator for requesting the information regarding the second NWDAF, an identifier of the first NWDAF, address information of the first NWDAF, information regarding an UE associated with analytic information requested from the NF, information regarding the ML model used for the federated learning, and information regarding data available for training of the ML model used for the federated learning, or the discovery response message includes at least one of an identifier of the second NWDAF, address information of the second NWDAF, ML model information supported by the second NWDAF, or information regarding data available for training of the ML model supported by the second NWDAF.

The federated learning join request message includes at least one of an identifier of the first NWDAF, address information of the first NWDAF, ML model training transmission expiration information in the second NWDAF, or rule information of ML model training.

The at least one processor is further configured to receive, from the second NWDAF, a federated learning group generate request message, and transmit, to the second NWDAF, a federated learning group generate response message.

The at least one processor is further configured to confirm the federated learning group based on the federated learning join response message, and transmit, to the second NWDAF in the confirmed federated learning group, a federated learning execution start indicator.

The at least one processor is further configured to receive, from the second NWDAF, a federated learning group update request message for excluding at least one NWDAF from the federated learning group.

The disclosed embodiments provide an apparatus and a method for effectively providing a service in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
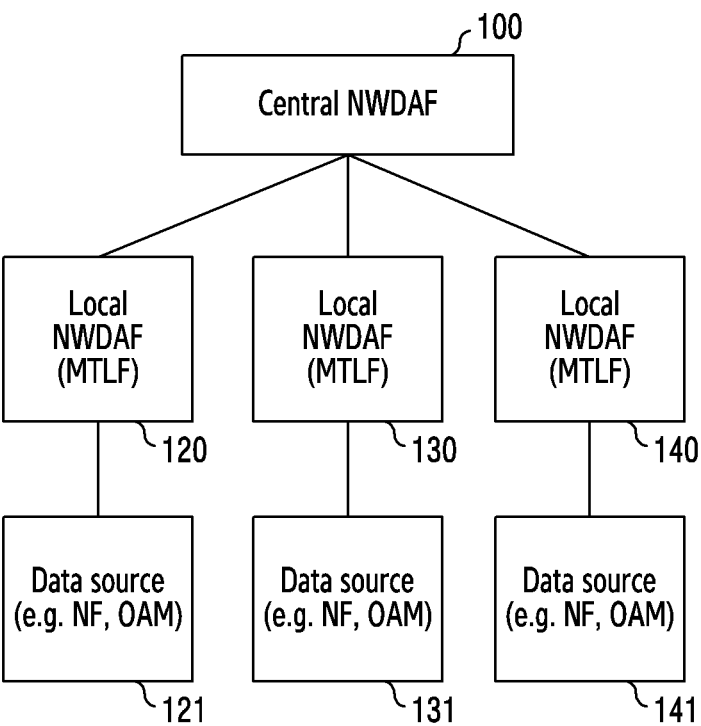
FIG. 1 illustrates connections between network data analytic functions (NWDAFs) for performing federated learning according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the disclosure, and methods for achieving them will be clarified with reference to embodiments described below in detail together with the accompanying drawings. However, the disclosure is not limited to the embodiments disclosed below, but may be implemented in various different forms, the embodiments are provided to only complete the disclosure of the disclosure and to allow those skilled in the art to which the disclosure pertains to fully understand a category of the disclosure, and the disclosure is solely defined within the scope of the claims. The same reference numeral refers to the same element throughout the specification.

At this time, it will be understood that each block of the process flowchart illustrations and combinations of the flowchart illustrations may be executed by computer program instructions. Since these computer program instructions may be mounted on the processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Further, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term '~unit' as used in the embodiment means software or a hardware component such as a field programmable gate array (FPGA) or an application-specific integrated circuit (ASIC), and '~unit' performs specific roles. However, '~unit' is not limited to software or hardware. '~unit' may be configured to reside on an addressable storage medium and configured to reproduce on one or more processors. Accordingly, '~unit' may include, for example, components such as software components, object-oriented software components, class components and task components, processes, functions, attributes, procedures, sub-routines, segments of program code, drivers, firmware, micro-code, circuitry, data, databases, data structures, tables, arrays, and variables. The functionalities provided in the components and '~unit' may be combined to fewer components and '~units' or may be further separated into additional components and '~units'. Further, the components and '~units' may be implemented to reproduce one or more central processing units (CPUs) within a device or a security multimedia card. Also, '~unit' in one embodiment may include one or more processors.

In describing the disclosure, a detailed description of a related known function or configuration will be omitted if it is deemed to make the gist of the disclosure unnecessarily vague. Embodiments of the disclosure shall be now explained by referring to the attached drawings.

Terms for identifying network entities or network functions and edge computing system entities, terms indicating messages, and terms indicating identification information used in the following explanation are illustrated only for convenience of description. Accordingly, the disclosure is not limited to the terms to be described, and other terms indicating targets having the same technical meaning may be used.

Hereafter, for convenience of description, the disclosure uses terms and names defined in long term evolution (LTE) and new radio (NR) standards which are the latest standards defined by the 3rd generation partnership project (3GPP) organization among currently existing communication standards. However, the disclosure is not limited by the terms and names, and may be applied equally to systems conforming to other standards. In particular, the disclosure may be applied to 3GPP NR (5th generation mobile communication standard). Also, the embodiments of the disclosure may also be applied to other communication systems having a similar technical background and channel format, with a slight modification. In addition, the embodiments of the disclosure may also be applied to other communication systems through some modification without greatly departing from the range of the disclosure based on a determination of those skilled in technical knowledge.

In the related art, a network data analytics function (NWDAF) which is a network function for performing machine learning in a mobile communication network does not support federated learning. Machine learning models which complete training between NWDAFs or data samples used for the learning are exchanged. However, there is no definition of a general procedure for supporting the exchange of the machine learning model which periodically trains to carry out the federated learning between a plurality of NWDAF instances to complete training of a specific machine learning model.

The disclosure provides a method for supporting federated learning in a wireless communication system. Specifically, the disclosure provides the method for generating a federated learning dedicated connection structure which may include a central NWDAF and local NWDAFs and managing a federal learning group.

The method of the disclosure may build one aggregated machine learning model without exchanging data samples between NWDAFs locally distributed. Since the data samples are not exchanged in the network, the method of the disclosure may not introduce considerable communication overhead and may prevent potential user information privacy violation.

FIG. 1 illustrates connections between NWDAFs for performing federated learning according to an embodiment of the disclosure.

A plurality of NWDAFs may carry out the federated learning by connecting a plurality of local NWDAFs 120, 130, and 140 based on a central NWDAF 100. The plurality of the local NWDAFs 120, 130, and 140 may include a model training logical function (MTLF) and may perform machine learning (ML) model training by use of local data resources 121, 131, and 141 connected thereto. For example, the MTLF, which is connected to the local NWDAF, may include, but not limited to, a network function or an operations, administration and maintenance (OAM) system for providing collected data.

The central NWDAF 100 may collect and calculate a learned machine learning (ML) model from the local NWDAFs 120, 130 and 140 locally distributed and thus build a global ML model or an aggregated ML model. The central NWDAF 100 may distribute the generated global ML model to the local NWDAFs 120, 130 and 140. The local NWDAFs 120, 130 and 140 may train the local ML model based on the global ML model and transmit the local ML model updated as above to the central NWDAF 100. According to an embodiment of the disclosure, the aforementioned operations may be repeated until a model training condition predetermined is satisfied.

Figure 2:
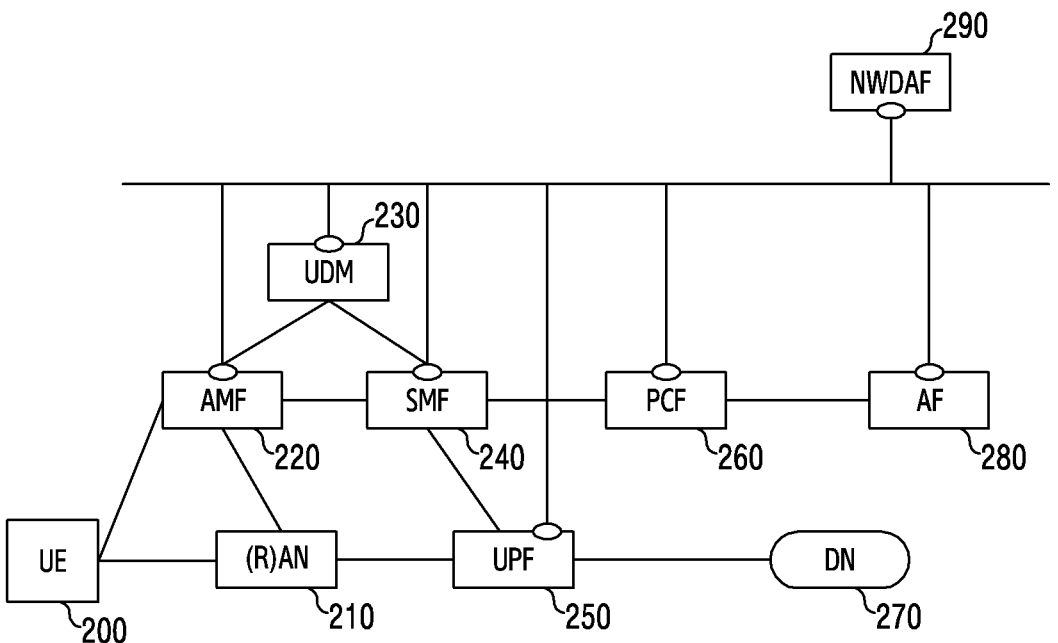
FIG. 2 illustrates in a 5th generation (5G) system architecture supporting a NWDAF according to an embodiment of the disclosure.

FIG. 2 illustrates in a 5th generation (5G) system architecture supporting a NWDAF according to an embodiment of the disclosure.

The 5G system architecture supporting the NWDAF according to an embodiment of the disclosure may include various network functions (NFs), and FIG. 2 illustrates an access and mobility management function (AMF) 220, a session management function (SMF) 240, a policy control function (PCF) 260, an application function (AF) 280, a unified data management (UDM) 230, a data network (DN) 270, a user plane function (UPF) 250, a (radio) access network ((R)AN) 210, and a user equipment (UE) 200, corresponding to some of NFs included in the 5G system architecture. That is, the 5G system architecture may include less or more entities than the entities (or functions) shown in FIG. 2.

Each NF (hereafter, used together with the network entity) may support the following functions.

The AMF 220 may provide a function for UE-based access and mobility management, and may be connected to one AMF per UE by default.

The DN 270 may indicate, for example, a network outside a 5G system (5GS) including an operator service, an internet access or a 3rd party service. The DN 270 may transmit a downlink protocol data unit (PDU) to the UPF, or receive a PDU transmitted from the UE from the UPF.

The PCF 260 may receive packet flow information from an application server, and provide a function of determining policies such as mobility management and session management. Specifically, the PCF 260 may support functions such as supporting a unified policy framework for controlling a network operation, providing a policy rule to allow control plane function(s) (e.g., the AMF, the SMF, etc.) to enforce the policy rule, and implementing a front end for accessing relevant subscription information to determine a policy within a UDR.

The SMF 240 may provide a session management function, and each session may be managed by a different SMF if the UE has a plurality of sessions.

The UDM 230 may store user subscription data and policy data.

The UPF 250 may forward the downlink PDU received from the DN to the UE via the (R)AN, and forward the uplink PDU received from the UE to the DN via the (R)AN.

The AF 280 may interoperate with a 3GPP core network to provide a service (e.g., to support functions such as influencing an application on traffic routing, accessing network capability exposure, interacting with a policy framework for policy control).

The NWDAF 290 may include at least one function of an analytics logical function (AnLF) and a model training logical function (MTLF), and may collect data in the 5G system and provide an analytics service based on the collected data. For example, it may train the ML model based on the data and provide analytics data required for network management and operation based on the trained model.

Figure 3:
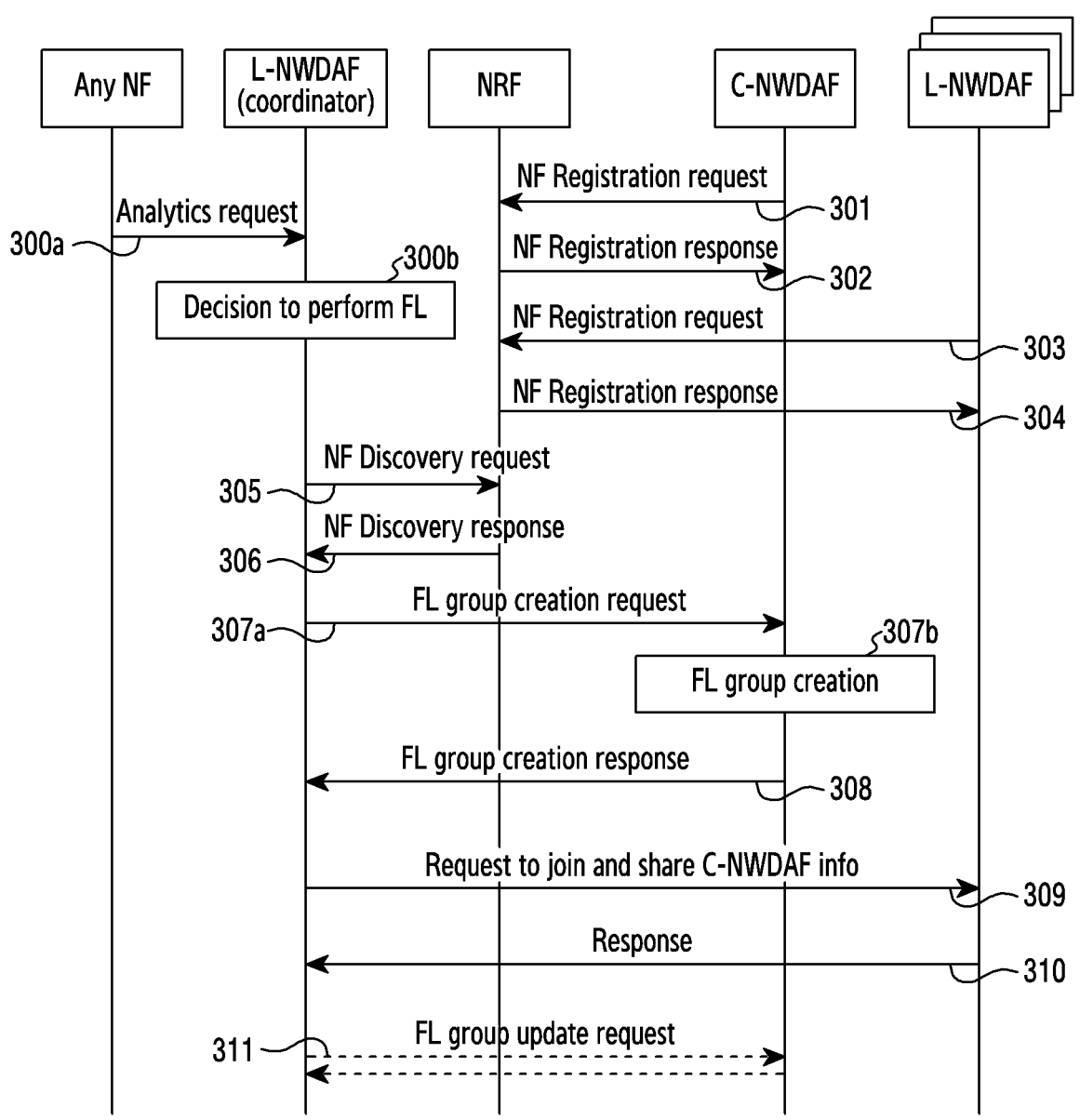
FIG. 3 illustrates a method for creating a federated learning group to provide an analytics service to a network function (NF) at a local NWDAF according to an embodiment of the disclosure.

FIG. 3 illustrates a method for creating a federated learning group to provide an analytics service to an NF at a local NWDAF according to an embodiment of the disclosure.

Referring to FIG. 3, a central NWDAF (C-NWDAF) which may serve as a federated learning (FL) aggregator transmits a registration request message to an NRF in operation 301. The registration request message may include the following information. It is noted that the disclosure is not limited to the following example.

NWDAF identifier (ID) and address information

FL aggregator capability: whether to support the function of creating a global ML model by aggregating a local ML model received from a local NWDAF supported model ID(s) and information: supported ML model ID and meta information (e.g., may include a supported model size, the number of parameters, etc.)

supported analytic ID(s): analytics ID provided through the FL associated messaging framework adaptor function (MFAF) information: information of an MFAF for associating with the C-NWDAF, for example, ID and address information associated data collection and coordination function (DCCF) information: information of a DCCF for associating with the C-NWDAF (e.g., address and ID)

data information available for ML model training (information for data set available at the local NWDAF): the number of data samples or a data set size, an ID list of a data source NFs connected with the local NWDAF, a type and the number of instances or a cardinality of NF set associated to the local NWDAF, PDU session information (e.g., may have a form of a number or a PDU session ID list and contain information of the number of PDU sessions for the local NWDAF to collect data) managed by the local NWDAF, the number of UEs managed by the local NWDAF (the number of UEs for the local NWDAF to collect data), network slice instance information managed by the local NWDAF (the number of network slice instances, single network slice selection assistance information (S-NS-SAI) list), data distribution information (e.g., may be represented with, as data distribution properties, information of how much the data set obtained or used by the local NWDAF is independent and identically distributed (i.i.d) or as "Low", "Medium", "High" or "Highest" in a degree of (non-) IID form. The data distribution information may be included as some parameter value of data statistical properties.), a service area (tracking area ID list, cell ID list, etc.), a data network name or a data network access identifier (data network information for the NWDAF to collect data and provide the analytics service)

In operation 302, a network repository function (NRF) may store C-NWDAF information and transmit a response message including whether the registration is successfully completed.

In operation 303, another local NWDAF may also transmit to the NRF a request message for registering its information at the NRF in the same manner as operation 301. The information provided from the local NWDAF the NRF may include, but not limited to, the information explained in operation 301.

In operation 304, the NRF may store local NWDAF information and transmit a response message including whether the registration is successfully completed. If the registration fails, a response message of the registration failure may be transmitted and information of a failure cause may be transmitted together.

In operation 305, the local NWDAF may receive from the NF (e.g., the AMF) an analytics request message (an analytics ID, a FL execution request indicator, an NF provision data share permission indicator, data distribution information obtained or provided by NF, an analytics service provision time requirement, an analytics service accuracy requirement and so on may be included in the request message), and then, if at least one of the following conditions is satisfied, the local NWDAF may determine to perform the FL in operation 300b and transmit a NWDAF discovery request for obtaining C-NWDAF information.

If the NF provides the FL execution request indicator, or an NF provision data no share indicator (an NF provision data share permission indicator indicating "not permitted")

If it is configured to require the analytics requested by the NF from the local NWDAF, for example, if the analytics ID requested by the NF matches an FL-required analytics ID which is predefined, as another example, if the analytics ID requested by the NF requires ML model training based on UE related data and it is forbidden to provide the UE related data out of a specific area or to other NF If datasets for training the model in the local NWDAF are not sufficient If the local NWDAF has no FL aggregator capability The NWDAF discovery request message transmitted by the local NWDAF to the NRF may include, but not limited to, at least one of the following information.

FL aggregator capability: to request C-NWDAF informa-
tion for serving as the FL aggregator from the NRF
FL indicator: an indicator for requesting NWDAF infor-
mation to participate in the FL
local NWDAF information (address and ID)
UE ID or UE group ID (included only if the analytics
requested by the NF corresponds to a specific UE or UE
group)
supported ML model information: ML model information
(ID, etc.) supported in the local NWDAF and used for
the FL, and since the training needs to conduct on the
same model according to characteristics of the FL, used
to discover the C-NWDAF and other participating local
NWDAF (a local NWDAF for participating in the FL
group) supporting the same model (for building a
global model with the model supported by the local
NWDAF) as the model supported by the local NWDAF
analytics ID: the analytics ID requested by the NF from
the local NWDAF, analytics information for perform-
ing the FL
data information requirements available for ML model
training: may have data information values available
for the ML model training specified in operation 301.
may be used to obtain data satisfying the corresponding
requirements or to select an available NWDAF.
service area (tracking area ID list, cell ID list, etc.)
data network name or data network access identifier: data
network information for the local NWDAF to collect
data and to provide the analytics service
Receiving the analytics request message in operation
300a and determining to perform the local NWDAF FL in
operation 300b may be performed even before operation 301
through operation 304.
In operation 306, the NRF may provide the C-NWDAF
and other participating local NWDAF information matching
the information provided by the local NWDAF in the
NWDAF discovery request message in operation 305, using
a response message. According to an embodiment of the
disclosure, the local NWDAF may generate and transmit to
the NRF a separate message for requesting to discover the
C-NWDAF and the participating local NWDAF. If the local
NWDAF generates and transmits to the NRF the separate
message for requesting to discover the C-NWDAF and the
participating local NWDAF, the NRF may transmit a
response corresponding to the request to the local NWDAF.
In operation 307a, the local NWDAF may request an FL
group creation request to the C-NWDAF obtained from the
NRF. The FL group creation request message may include,
but not limited to, at least one of the following information.
local NWDAF ID and address information
FL group creation request indicator
analytics ID
ML model information (model ID, model size, etc.)
model training complete time or accuracy requirement of
the trained model
other participating local NWDAF candidate group infor-
mation obtained from NRF (list of L-NWDAF infor-
mation)
In operation 307b, the C-NWDAF may create the FL
group. In operation 308, the C-NWDAF may generate and
provide FL group and associated FL operation info to the
local NWDAF. The FL operation info may include, but not
limited to, the following information.
participating (joining) local NWDAF information in FL
group (list of FL group NWDAF information, address
and ID information, etc.): The C-NWDAF may provide
the local NWDAF with information of the other par-

Figure 4:
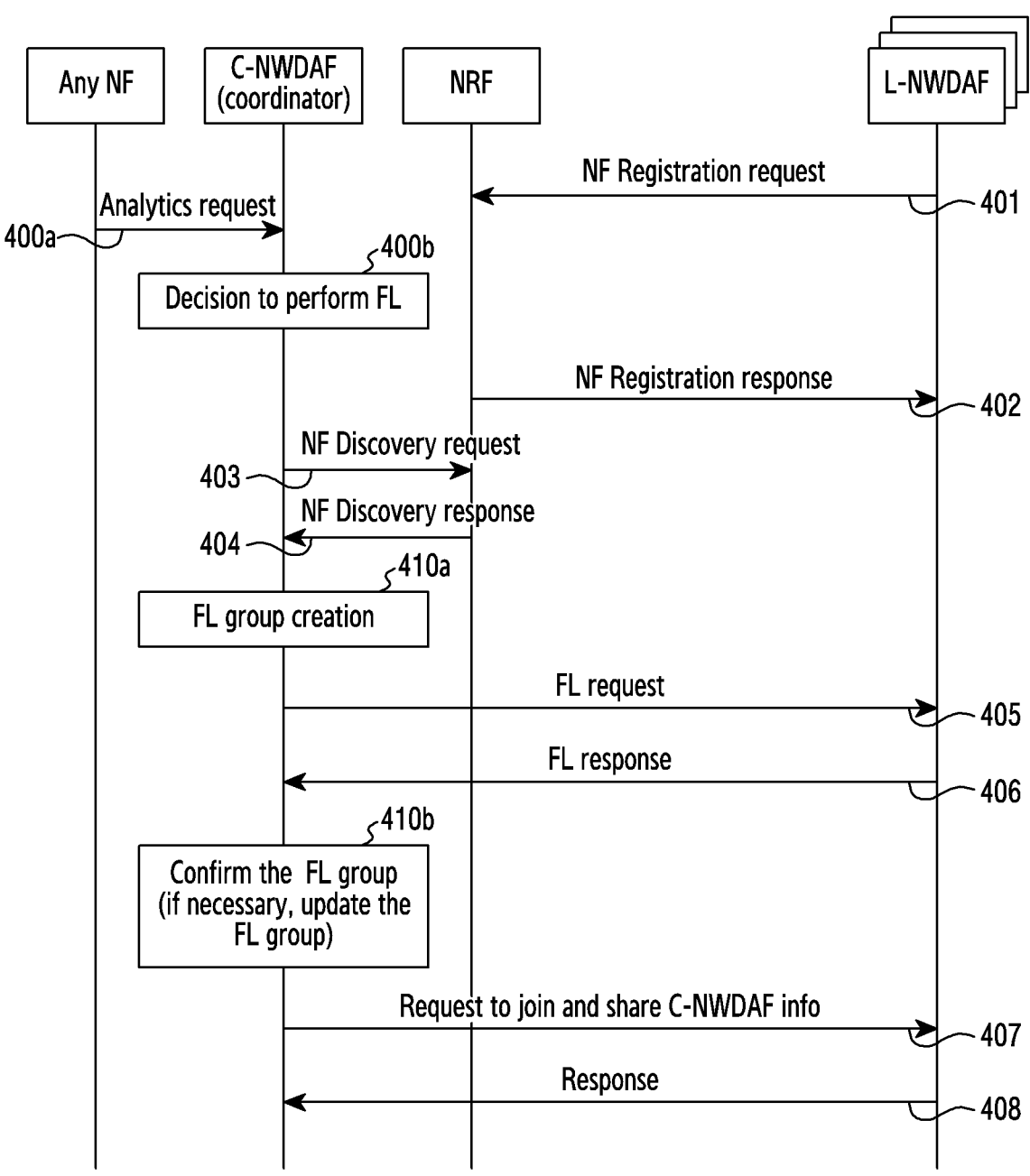
FIG. 4 illustrates a method for creating a federated learning group to provide an analytics service to an NF at a central NWDAF according to an embodiment of the disclosure.

12 ticipating local NWDAF connected thereto and partici-
pating in the FL. The participating local NWDAF
information provided by the C-NWDAF may be dif-
ferent from the information obtained by the local
NWDAF from the NRF. If necessary, the C-NWDAF
may define a final FL group by adding or excluding the
participating local NWDAF.
local ML model training transmission expiration infor-
mation performed at local NWDAF: information noti-
fying to perform transmission to the C-NWDAF within
a specific time after the local NWDAF finishes the
training, the C-NWDAF may build the global ML
model by aggregating ML local models of the partici-
pating local NWDAF in the FL group received until the
specific time. The transmission expiration information
may be provided in the form of an epoch deadline (e.g.,
in the form of a specific time length (duration) value
and a time stamp value. The C-NWDAF provides timer
start with the time stamp value, and the timer notifies
expiration after a specific time passes), number of
arrivals of local model (in the form of a specific natural
number, to notify of central ML model creation start if
the C-NWDAF receives the local ML model from a
specific number of local NWDAFs of the FL group) or
a dynamic duration indicator (an indicator notifying of
the global ML model creation start if receiving the local
ML model from every local NWDAF of the FL group
or the global ML model creation arbitrarily started by
the C-NWDAF).
local processing rule (proportional to local dataset size) or
targe accuracy or number of local iterations) or local
processing rule ID: rule information of local ML train-
ing iterations of the local NWDAF, target training
accuracy to achieve, and so on
According to an embodiment of the disclosure, the
C-NWDAF may provide an FL operation rule index alone
without providing the aforementioned parameter values. The
FL operation rule index may indicate a preset FL operation
rule.
In operation 309, the local NWDAF may transmit the
C-NWDAF information and the FL operation info received
from the C-NWDAF to other local NWDAF participating in
the FL group.
In operation 310, the local NWDAF may receive a
response from participating local NWDAFs of other FL
groups. The response message from the participating local
NWDAFs may include, but not limited to, participation
information.
In operation 311, the local NWDAF may transmit an FL
group update message to the C-NWDAF to exclude the
participating local NWDAF which responds with no par-
ticipation from the FL group. The FL group update message
may include, but not limited to, ID or address information of
the local NWDAF excluded from the FL group.
FIG. 4 illustrates a method for creating an FL group to
provide an analytics service to an NF at a C-NWDAF
according to an embodiment of the disclosure.
In operation 401, a local NWDAF which may participate
in the FL and serve as the local NWDAF may transmit a
registration request message to an NRF. The registration
request message may include the following information.
Notably, the disclosure is not limited to the following
example.
NWDAF ID and address information
FL aggregator capability: whether to support a function of
building a global ML model by aggregating local ML
models received from the local NWDAF FL group participation indicator: an indicator notifying of the local NWDAF role served by participating in the FL supported model ID(s) and information: supported ML model ID and meta information (e.g., may include a supported model size, the number of parameters, etc.)

supported analytic ID(s): analytics ID provided through the FL associated MFAF information: information of an MFAF for associating with the C-NWDAF, for example, ID and address information associated DCCF information: information (e.g., address and ID) of a DCCF for associating with the C-NWDAF data information available for ML model training (information for data set available at the local NWDAF): the number of data samples or a data set size, an ID list of a data source NFs connected with the local NWDAF, a type and the number of instances or cardinality of NF set associated to the local NWDAF, PDU session information (e.g., may have a form of a number or a PDU session ID list and contain information of the number of PDU sessions for the local NWDAF to collect data) managed by the local NWDAF, the number of UEs managed by the local NWDAF (the number of UEs for the local NWDAF to collect data), network slice instance information managed by the local NWDAF (the number of network slice instances, S-NSSAI list), data distribution information (e.g., may be represented with, as data distribution properties, information of how much the data set obtained or used by the local NWDAF is independent and identically distributed (i.i.d) or as "Low", "Medium", "High" or "Highest" in a degree of (non-) IID form. The data distribution information may be included as some parameter value of data statistical properties.)

service area (tracking area ID list, cell ID list, etc.)

data network name or data network access identifier: data network information for the local NWDAF to collect data and to provide the analytics service In operation 402, an NRF may store local NWDAF information and transmit a response message including whether the registration is successfully completed.

In operation 403, after receiving from the NF (e.g., the AMF) the analytics request message (an analytics ID, a FL execution request indicator, an NF provision data share permission indicator, data distribution information obtained or provided by NF, an analytics service provision time requirement, an analytics service accuracy requirement and so on may be included in the request message) in operation 400a, if at least one of the following conditions is satisfied, the C-NWDAF may determine to perform the FL and transmit a NWDAF discovery request for obtaining local NWDAF information for participating in the FL. Notably, the disclosure is not limited to the following example.

If the message received from the NF includes an FL request indicator

If it is configured to require the FL for analytics requested by the FL, for example, if an analytics ID requested by the NF matches a predefined FL-required analytics ID If datasets for training the model in the C-NWDAF are not sufficient, The C-NWDAF may include at least one of, but not limited to, the following information into a NWDAF discovery request message transmitted to the NRF by considering requirements of the analytics requested by the NF.

FL aggregator capability: to request C-NWDAF information for serving as the FL aggregator from the NRF FL indicator: an indicator for requesting NWDAF information to participate in the FL C-NWDAF information (address and ID)

UE ID or UE group ID (included if the analytics requested by the NF corresponds to a specific UE or UE group)

supported ML model information: ML model information (ID, etc.) supported in the C-NWDAF and used for the FL, and since the training needs to conduct on the same model according to characteristics of the FL, used to discover a local NWDAF (a local NWDAF for participating in the FL group) supporting the same model (supported by the C-NWDAF and performing the local ML model training) as the model supported by the C-NWDAF analytics ID: the analytics ID requested by the NF from the C-NWDAF, analytics information for performing the FL data information requirements available for ML model training: may have data information values available for the ML model training specified in operation 401. It may be used to obtain data satisfying the corresponding requirements or to select an available NWDAF. For example, the following information may be included: the number of data samples or a data set size, an ID list of data source NFs connected with the local NWDAF, a type and the number of instances or a cardinality of NF set associated to the local NWDAF, PDU session information (e.g., may have the form of a number and a PDU session ID list and includes information of the number of PDU sessions for the local NWDAF to collect data), the number of UEs managed by the local NWDAF (the number of UEs for the local NWDAF to collect data), network slice instance information managed by the local NWDAF (the number of network slice instances, S-NSSAI list), data distribution information (e.g., may be represented with, as data distribution properties, information of how much the data set obtained or used by the local NWDAF is independent and identically distributed (i.i.d) or as "Low", "Medium", "High" or "Highest" in a degree of (non-) IID form. The data distribution information may be included as some parameter value of data statistical properties.)

Receiving the analytics request message in operation 400a and determining to perform the local NWDAF FL in operation 400b may be performed even before operation 401 through operation 404.

In operation 404, the NRF may provide local NWDAF information matching the information provided by the C-NWDAF in operation 403. The local NWDAF information (information of a plurality of local NWDAFs) may include, but not limited to, the following.

local NWDAF ID and address information

Data information available for ML model training of the individual local NWDAF supported ML model information of the individual local NWDAF In operation 410a, the C-NWDAF may create the FL group. In operation 405, the C-NWDAF may transmit an FL participation request message to all or some of the local NWDAFs discovered in the previous operation. The FL participation request message may include, but not limited to, the following FL operation information.

C-NWDAF address and ID information analytics ID and ML model information (ID and model information) for the FL local ML model training transmission expiration information performed at local NWDAF: information notifying to perform transmission to the C-NWDAF within a specific time after the local NWDAF finishes the training, the C-NWDAF build a global ML model by aggregating ML local models of participating local NWDAFs in an FL group received until a specific time. The transmission expiration information may be provided in the form of an epoch deadline (e.g., in the form of a specific time length value and a time stamp value. The C-NWDAF provides timer start with the time stamp value, and the timer notifies expiration after a specific time passes), number of arrivals of local model (in the form of a specific natural number, to notify of central ML model creation start if the C-NWDAF receives the local ML model from a specific number of local NWDAFs of the FL group) or a dynamic duration indicator (an indicator notifying of the global ML model creation start if receiving the local ML model from every local NWDAF of the FL group or the global ML model creation arbitrarily started by the C-NWDAF).

local processing rule (proportional to local dataset size) or targe accuracy or number of local iterations) or local processing rule ID: rule information of local ML training iterations of the local NWDAF, target training accuracy to achieve, and so on According to an embodiment of the disclosure, the C-NWDAF may provide an FL operation rule index alone without providing specific parameter values. The FL operation rule index may indicate a preset FL operation rule.

In operation 406, the local NWDAF may transmit to the C-NWDAF a response message including whether to participate. In operation 410b, the C-NWDAF may confirm the FL group, and if necessary, update the FL group.

In operation 407, the C-NWDAF may finalize the FL group including the local NWDAFs which respond with the participation and assign FL group IDs. The C-NWDAF may transmit FL operation information and an FL execution start indicator to the local NWDAFs of the finalized FL group. In so doing, the FL operation information transmitted to the local NWDAF may be different from the FL operation information transmitted in the previous operation 405 (e.g., the number of the participating local NWDAFs may reduce in operation 406 and accordingly the C-NWDAF may modify the FL operation rule).

In operation 408, the local NWDAF may transmit successful FL to the C-NWDAF and perform the FL.

Figure 5:
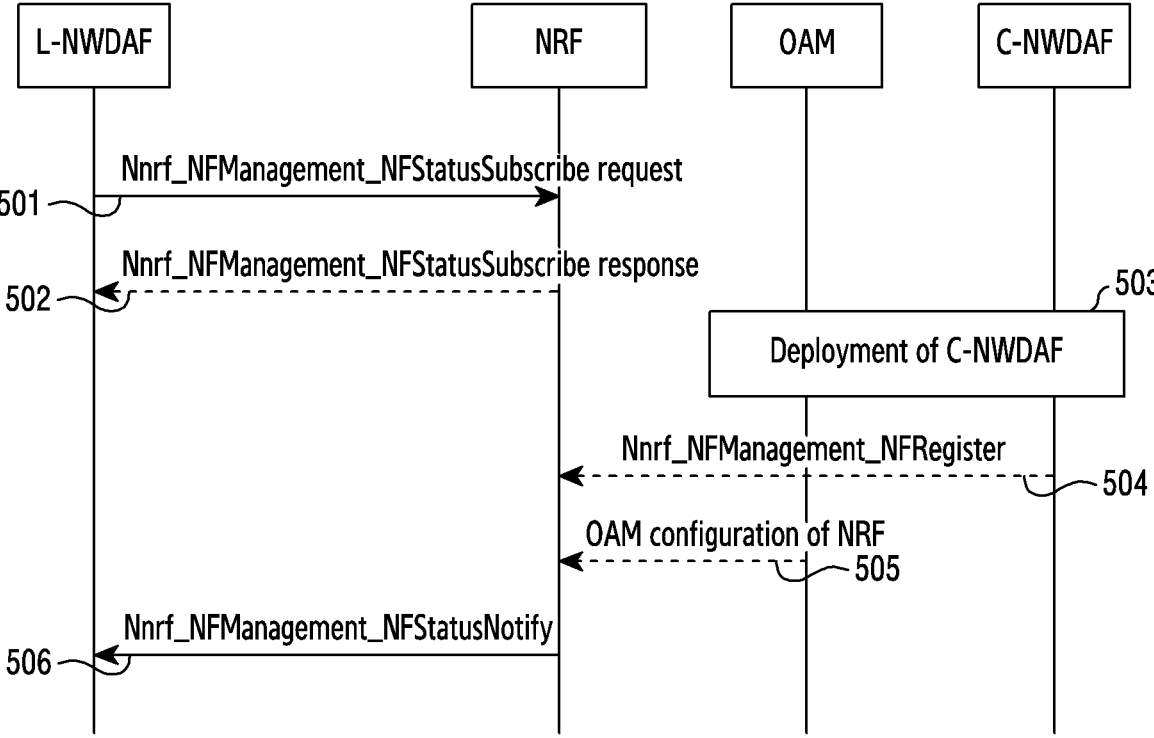
FIG. 5 illustrates a method for configuring central NWDAF information available to a local NWDAF according to an embodiment of the disclosure.

FIG. 5 illustrates a method for configuring C-NWDAF information available for a local NWDAF according to an embodiment of the disclosure.

In operation 501, the local NWDAF may transmit to an NRF a subscription service request message (e.g., Nnrf_NF-Management_NFStatusSubscribe request message of FIG. 5) for obtaining associated C-NWDAF information. The subscription service request message may include, but not limited to, at least one of the following information.

notification target address (may include a local NWDAF address as a notification target address. In addition, addresses of other local NWDAF participating in the FL in the FL group may be provided to the NRF)

local NWDAF address and ID information

FL indicator (NWDAF information request indicator for performing the FL)

FL aggregator capability: whether to support the function of creating a global ML model by aggregating a local ML model received from a local NWDAF supported model ID(s) and information: supported ML model ID and meta information (e.g., may include a supported model size, the number of parameters, etc.)

supported analytic ID(s): analytics ID provided through the FL associated MFAF information: information of an MFAF for associating with the local NWDAF, for example, ID and address information associated DCCF information: information of a DCCF for associating with the local NWDAF (e.g., address and ID, etc.)

data information available for ML model training (information for data set available at the local NWDAF): the number of data samples or a data set size, an ID list of a data source NFs connected with the local NWDAF, a type and the number of instances or a cardinality of NF set associated to the local NWDAF, PDU session information (e.g., may have a form of a number or a PDU session ID list and contain information of the number of PDU sessions for the local NWDAF to collect data) managed by the local NWDAF, the number of UEs managed by the local NWDAF (the number of UEs for the local NWDAF to collect data), network slice instance information managed by the local NWDAF (the number of network slice instances, S-NSSAI list), data distribution information (e.g., may be represented with, as data distribution properties, information of how much the data set obtained or used by the local NWDAF is independent and identically distributed (i.i.d) or as "Low", "Medium", "High" or "Highest" in a degree of (non-) IID form.

The data distribution information may be included as some parameter value of data statistical properties.), a service area (tracking area ID list, cell ID list, etc.), a data network name or a data network access identifier (data network information for the NWDAF to collect data and provide the analytics service)

service area information (e.g., tracking area ID list, cell ID list, etc.)

data network access identifier or data network name for allowing analytics service through FL In operation 502, the NRF allocates resources for performing the notification received from the local NWDAF and transmit to the local NWDAF a response message notifying of the successful subscription. The response message may include, but not limited to, the following information.

subscription correlation ID, notification correlation ID

C-NWDAF information (information such as address and ID. If C-NWDAF information matching the request of the local NWDAF is registered at the NRF, the response message for the subscription may include the C-NWDAF information.)

In operation 503, the OAM may create and deploy a C-NWDAF instance. The created C-NWDAF may include, but not limited to, the following information.

NWDAF ID and address information

FL aggregator capability: whether to support a function of building a global ML model by aggregating local ML models received from the local NWDAF supported model ID(s) and information: supported ML model ID and meta information (e.g., may include a supported model size, the number of parameters, etc.)

supported analytic ID(s): analytics ID provided through the FL associated MFAF information: information of an MFAF for associating with the C-NWDAF, for example, ID and address information associated DCCF information: information of a DCCF for associating with the C-NWDAF (e.g., address and ID, etc.)

participating local NWDAF information in a preset FL group (list of FL group NWDAF information, address and ID information, etc.): The C-NWDAF may be configured with participating local NWDAF information connected thereto and participating in the FL, by the OAM.

local ML model training transmission expiration information performed at local NWDAF: information notifying to perform transmission to the C-NWDAF within a specific time after the local NWDAF finishes the training, the C-NWDAF build a global ML model by aggregating ML local models of participating local NWDAFs in an FL group received until a specific time. The transmission expiration information may be provided in the form of an epoch deadline (e.g., in the form of a specific time length value and a time stamp value. The C-NWDAF provides timer start with the time stamp value, and the timer notifies expiration after a specific time passes), number of arrivals of local model (in the form of a specific natural number, to notify of central ML model creation start if the C-NWDAF receives the local ML model from a specific number of local NWDAFs of the FL group) or a dynamic duration indicator (an indicator notifying of the global ML model creation start if receiving the local ML model from every local NWDAF of the FL group or the global ML model creation arbitrarily started by the C-NWDAF).

local processing rule (proportional to local dataset size) or targe accuracy or number of local iterations) or local processing rule ID: rule information of local ML training iterations of the local NWDAF, target training accuracy to achieve, and so on According to an embodiment of the disclosure, the C-NWDAF may provide an FL operation rule index alone without providing specific parameter values. The FL operation rule index may indicate a preset FL operation rule.

In operation 504, the C-NWDAF created by the OAM may transmit a registration request message including the information described in operation 503 to the NRF.

In operation 505, the OAM may directly register the generated C-NWDAF information (the information described in operation 503) at the NRF according to a provider policy. The C-NWDAF information may be registered as NF profile information.

In operation 506, the NRF requested by the OAM or the C-NWDAF to register may store corresponding C-NWDAF information. If the C-NWDAF matches the NRF subscription request in operation 501, the NRF may transmit the corresponding C-NWDAF information in a notification message to the notification target address provided by the local NWDAF of operation 501.

Figure 6:
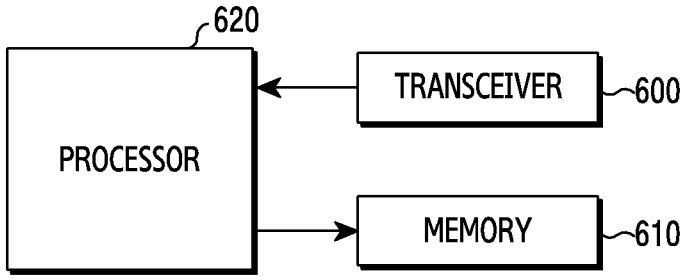
FIG. 6 is a block diagram of a terminal structure according to an embodiment of the disclosure.

FIG. 6 is a block diagram of a UE structure according to an embodiment of the disclosure.

Referring to FIG. 6, the UE of the disclosure may include a processor 620, a transceiver 600, and a memory 610. The components of the UE are not limited to this embodiment. For example, the UE may include more or less components than the above components. Besides, the processor 620, the transceiver 600 and the memory 610 may be implemented as a single chip.

According to an embodiment of the disclosure, the processor 620 may control a series of UE operations according to the embodiment of the disclosure. For example, the processor 620 may control the components of the UE to carry out the method for supporting the FL according to the embodiments. The processor 620 may control the components of the UE to fulfill the embodiments of the disclosure by executing a program stored in the memory 610. The processor 620 may be an application processor (AP), a communication processor (CP), a circuit, an application-specific circuit, or at least one processor.

According to an embodiment of the disclosure, the transceiver 600 may transmit and receive a signal to and from a network entity, another UE or a base station. The signal transmitted and received to and from the network entity, another UE or the base station may include control information, and data. The transceiver 600 may include a radio frequency (RF) transmitter for up-converting and amplifying a frequency of a transmit signal, an RF receiver for low-noise-amplifying a received signal and down-converting its frequency, and so on. The transceiver 600 is exemplary, and the components of the transceiver 600 are not limited to the RF transmitter and the RF receiver. The transceiver 600 may receive a signal over a radio channel and output it to the processor 620, and transmit a signal outputted from the processor 620 over the radio channel.

According to an embodiment of the disclosure, the memory 610 may store programs and data required for operating the UE. The memory 610 may store the control information or the data included in the signal transmitted and received by the UE. The memory 610 may include a storage medium such as a read only memory (ROM), a random access memory (RAM), a hard disc, a compact disc (CD)-ROM and a digital versatile disc (DVD), or a combination of them. A plurality of the memories 610 may be provided. According to an embodiment, the memory 610 may store a program for carrying out the method for supporting the FL.

Figure 7:
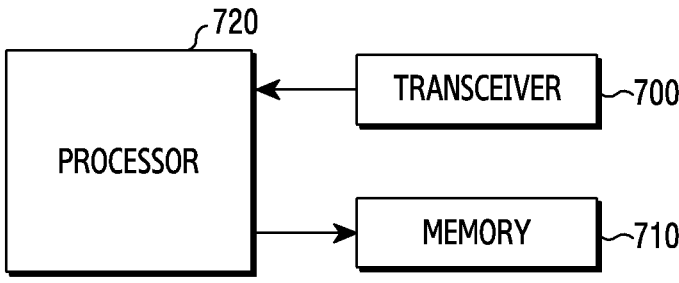
FIG. 7 is a block diagram of a base station structure according to an embodiment of the disclosure.

FIG. 7 is a block diagram of a base station structure according to an embodiment of the disclosure.

Referring to FIG. 7, the base station of the disclosure may include a processor 720, a transceiver 700, and a memory 710. The components of the base station are not limited to this embodiment. For example, the base station may include more or less components than the components. In addition, the processor 720, the transceiver 700 and the memory 710 may be implemented as a single chip.

According to an embodiment of the disclosure, the processor 720 may control a series of base station operations according to the embodiment of the disclosure. For example, the processor 720 may control the components of the base station to carry out the method for supporting the FL according to the embodiments. The processor 720 may control the components of the base station to fulfill the embodiments of the disclosure by executing a program stored in the memory 710. The processor 720 may be an AP, a CP, a circuit, an application-specific circuit, or at least one processor.

According to an embodiment of the disclosure, the transceiver 700 may transmit and receive a signal to and from a network entity, another base station or a UE. The signal transmitted and received to and from the network entity, another base station or the UE may include control information, and data. The transceiver 700 may include an RF transmitter for up-converting and amplifying a frequency of a transmit signal, an RF receiver for low-noise-amplifying a received signal and down-converting its frequency, and so on. The transceiver 700 is exemplary, and the components of the transceiver 700 are not limited to the RF transmitter and the RF receiver. The transceiver 700 may receive a signal over a radio channel and output it to the processor 720, and transmit a signal outputted from the processor 720 over the radio channel.

According to an embodiment of the disclosure, the memory 710 may store programs and data required for operating the base station. The memory 710 may store the control information or the data included in the signal transmitted and received by the base station. The memory 710 may include a storage medium such as a ROM, a RAM, a hard disc, a CD-ROM and a DVD, or a combination of them. A plurality of the memories 710 may be provided. According to an embodiment, the memory 710 may store a program for carrying out the method for supporting the FL.

Figure 8:
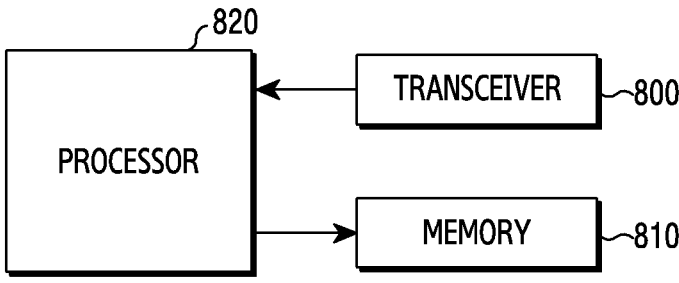
FIG. 8 is a block diagram of a network entity structure according to an embodiment of the disclosure.

FIG. 8 is a block diagram of a network entity structure according to an embodiment of the disclosure.

Referring to FIG. 8, the network entity of the disclosure may include a processor 820, a transceiver 800, and a memory 810. The components of the network entity are not limited to this embodiment. For example, the network entity may include more or less components than the components. In addition, the processor 820, the transceiver 800 and the memory 810 may be implemented as a single chip. According to an embodiment of the disclosure, the network entity may indicate the NF, and the NF may include the radio access network (RAN), the AMF, the PCF, the UDM, the AF, the network exposure function (NEF), the Unmanned aircraft system traffic management (UTM) and the like.

According to an embodiment of the disclosure, the processor 820 may control a series of NF operations according to the embodiment of the disclosure. For example, the processor 820 may control the components of the network entity to carry out the method for supporting the FL according to the embodiments. The processor 820 may control the components of the network entity to carry out the embodiments of the disclosure by executing a program stored in the memory 810. The processor 820 may be an AP, a CP, a circuit, an application-specific circuit, or at least one processor.

According to an embodiment of the disclosure, the transceiver 800 may transmit and receive a signal to and from other network entity, a base station or a UE. The signal transmitted and received to and from other network entity, the base station or the UE may include control information, and data. The transceiver 800 may include an RF transmitter for up-converting and amplifying a frequency of a transmit signal, an RF receiver for low-noise-amplifying a received signal and down-converting its frequency, and so on. The transceiver 800 is exemplary, and the components of the transceiver 800 are not limited to the RF transmitter and the RF receiver. The transceiver 800 may receive a signal over a radio channel and output it to the processor 820, and transmit a signal outputted from the processor 820 over the radio channel.

According to an embodiment of the disclosure, the memory 810 may store programs and data required for operating the network entity. The memory 810 may store the control information or the data included in the signal transmitted and received by the network entity. The memory 810 may include a storage medium such as a ROM, a RAM, a hard disc, a CD-ROM and a DVD, or a combination of them. A plurality of the memories 810 may be provided. According to an embodiment, the memory 810 may store a program for carrying out the method for supporting the FL.

According to an embodiment of the disclosure, a method for supporting FL of a local NWDAF may include receiving an analytics request message from a specific NF; determining whether to perform the FL based on the analytics request message; transmitting to an NRF an NWDAF discovery request for obtaining C-NWDAF information; receiving from the NRF a discovery response message including C-NWDAF and at least one participating local NWDAF information; transmitting an FL group creation request message to the C-NWDAF; receiving an FL group creation response message including information of the created FL group from the C-NWDAF; transmitting a participation request message including the C-NWDAF information to the at least one participating local NWDAF based on the FL group information; and receiving a response message from the at least one participating local NWDAF.

According to an embodiment of the disclosure, a method for supporting FL of a C-NWDAF may include receiving an analytics request message from a specific NF; determining whether to perform the FL based on the analytics request message; transmitting to an NRF an NWDAF discovery request for obtaining local NWDAF information; receiving from the NRF a discovery response message including at least one local NWDAF information; transmitting an FL participation request message to all or some of the at least one local NWDAF; and receiving a response message from all or some of the at least one local NWDAF.

According to an embodiment of the disclosure, a method for supporting FL of an NRF may include receiving a subscription request message from a local NWDAF; storing information of the local NWDAF; transmitting to the NWDAF a response message including information of whether registration is finished; receiving from a C-NWDAF a NWDAF discovery request message including information used to determine a local NWDAF required for the FL; and transmitting a discovery response message including information of at least one local NWDAF to the C-NWDAF in response to the NWDAF discovery message.

The methods according to the embodiments described in the claims or the specification of the disclosure may be implemented in software, hardware, or a combination of hardware and software.

As for the software, a non-transitory computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a ROM, an electrically erasable programmable ROM (EEPROM), a magnetic disc storage device, a CD-ROM, DVD or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing federated learning (FL) by a network repository function (NRF), the method comprising:

receiving, from a central network data analytic function (NWDAF), a first registration request message including information on a FL capability type;

transmitting, to the central NWDAF, a first registration response message;

receiving, from a plurality of local NWDAFs, a plurality of second registration request messages;

transmitting, to the plurality of local NWDAFs, a plurality of second registration response message;

receiving, from the central NWDAF, a discovery request message; and transmitting, to the central NWDAF, a discovery response message including information about the plurality of the local NWDAFs, wherein at least one NWDAF for a federated learning group is determined among the plurality of the local NWDAFs, based on information on a network function (NF) of a data source, and information, included in respective federated learning join response messages received from the plurality of the local NWDAFs, indicating whether to participate in the federated learning group.

2. The method of claim 1, wherein the at least one NWDAF for the federated learning group is further determined based on at least one of information on FL capability type and the information on a service area.

3. The method of claim 1, wherein the central NWDAF requests the at least one NWDAF for the federated learning group to train a machine learning model and reports machine learning model information.

4. The method of claim 1, wherein the central NWDAF generates a global machine learning model based on the machine learning model information obtained from the at least one NWDAF for the federated learning group and sends the global machine learning model to the at least one NWDAF for the federated learning group.

5. A method of performing federated learning (FL) by a central network data analytic function (NWDAF), the method comprising:

transmitting, to a network repository function (NRF), a registration request message including information on FL capability type;

receiving, from the NRF, a registration response message;

transmitting, to the NRF, a discovery request message;

receiving, from the NRF, a discovery response message including information about a plurality of local NWDAFs;

transmitting, to a plurality of local NWDAFs, respective federated learning join request messages; and receiving, from the plurality of local NWDAFs, respective federated learning join response messages including information indicating whether to participate in a federated learning group, wherein at least one NWDAF for a federated learning group is determined among the plurality of the local NWDAFs, based on information on a network function (NF) of a data source, and information, included in respective federated learning join response messages received from the plurality of the local NWDAFs, indicating whether to participate in the federated learning group.

6. The method of claim 5, wherein the at least one NWDAF for the federated learning group is further determined based on at least one of information on FL capability type and information on a service area.

7. The method of claim 5, wherein the central NWDAF generates a global machine learning model based on the machine learning model information obtained from the at least one NWDAF for the federated learning group and sends the global machine learning model to the at least one NWDAF for the federated learning group.

8. The method of claim 5, wherein the transmitting the discovery request message comprises transmitting the discovery request message, based on whether the federated learning is required, which is determined based on an analytic ID.

9. A network repository function (NRF) of performing federated learning (FL), the NRF comprising:

a transceiver; and at least one processor coupled with the transceiver and configured to:

receive, from a central network data analytic function (NWDAF), a first registration request message including information on a FL capability type;

transmit, to the central NWDAF, a first registration response message;

receive, from a plurality of local NWDAFs, a plurality of second registration request messages;

transmit to the plurality of local NWDAFs, a plurality of second registration response message;

receive, from the central NWDAF, a discovery request message; and transmit, to the central NWDAF, a discovery response message including information about the plurality of the local NWDAFs, wherein at least one NWDAF for a federated learning group is determined among the plurality of the local NWDAFs, based on information on a network function (NF) of a data source, and information, included in respective federated learning join response messages received from the plurality of the local NWDAFs, indicating whether to participate in the federated learning group.

10. The NRF of claim 9, wherein the at least one NWDAF for the federated learning group is further determined based on at least one of information on FL capability type and information on a service area.

11. The NRF of claim 9, wherein the central NWDAF requests the at least one NWDAF for the federated learning group to train a machine learning model and reports machine learning model information.

12. The NRF of claim 9, wherein the central NWDAF generates a global machine learning model based on the machine learning model information obtained from the at least one NWDAF for the federated learning group and sends the global machine learning model to the at least one NWDAF for the federated learning group.

13. A central network data analytic function (NWDAF) of performing federated learning (FL), the central NWDAF comprising:

a transceiver; and at least one processor coupled with the transceiver and configured to:

transmit, to a network repository function (NRF), a registration request message including information on FL capability type, receive, from the NRF, a registration response message, transmit, to the NRF, a discovery request message, receive, from the NRF, a discovery response message including information about a plurality of local NWDAFs, transmit, to a plurality of local NWDAFs, respective federated learning join request messages; and receive, from the plurality of local NWDAFs, respective federated learning join response messages including information indicating whether to participate in a federated learning group, wherein at least one NWDAF for a federated learning group is determined among the plurality of the local NWDAFs, based on information on a network function (NF) of a data source, and information, included in respective federated learning join response messages received from the plurality of the local NWDAFs, indicating whether to participate in the federated learning group.

14. The central NWDAF of claim 13, wherein the at least one NWDAF for the federated learning group is further determined based on at least one of information on FL capability type and information on a service area.

15. The central NWDAF of claim 13, wherein the central NWDAF generates a global machine learning model based on the machine learning model information obtained from the at least one NWDAF for the federated learning group and sends the global machine learning model to the at least one NWDAF for the federated learning group.

16. The central NWDAF of claim 13, wherein the at least one processor is further configured to transmit the discovery request message, based on whether the federated learning is required, which is determined based on an analytic ID.

* * * * *